(12) United States Patent
Han

(10) Patent No.: US 11,594,019 B2
(45) Date of Patent: Feb. 28, 2023

(54) REFRIGERATOR, SERVER, AND OBJECT RECOGNITION METHOD OF REFRIGERATOR

(71) Applicant: Samsung Electronics Co., Ltd., Suwon-si (KR)

(72) Inventor: Seongjoo Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/268,009

(22) PCT Filed: Sep. 27, 2019

(86) PCT No.: PCT/KR2019/012645
§ 371 (c)(1),
(2) Date: Feb. 11, 2021

(87) PCT Pub. No.: WO2020/071692
PCT Pub. Date: Apr. 9, 2020

(65) Prior Publication Data
US 2021/0209363 A1    Jul. 8, 2021

(30) Foreign Application Priority Data
Oct. 1, 2018 (KR) .................. 10-2018-0117133

(51) Int. Cl.
*G06K 9/00* (2022.01)
*G06V 20/10* (2022.01)
(Continued)

(52) U.S. Cl.
CPC ............. *G06V 20/10* (2022.01); *F25D 29/00* (2013.01); *G06K 9/6217* (2013.01); *G06T 7/246* (2017.01);
(Continued)

(58) Field of Classification Search
CPC ...... G06V 20/10; G06V 10/40; G06V 10/758; F25D 29/00; F25D 2700/06;
(Continued)

(56) References Cited

U.S. PATENT DOCUMENTS

2003/0117611 A1   7/2003   Chon et al.
2006/0133785 A1*   6/2006   Ko .......................... G06T 7/20
      396/54
(Continued)

FOREIGN PATENT DOCUMENTS

EP   3 745 304 A1   12/2020
JP   6296908 B2   3/2018
(Continued)

OTHER PUBLICATIONS

International Search Report, PCT/ISA/210, dated Jan. 21, 2020, in corresponding International Patent Application No. PCT/KR2019/012645.
(Continued)

*Primary Examiner* — Stephen P Coleman
(74) *Attorney, Agent, or Firm* — Staas & Halsey LLP

(57) ABSTRACT

An object recognition method of a refrigerator is disclosed. The disclosed object recognition method of a refrigerator comprises the steps of: obtaining a captured image of a storage compartment of a refrigerator; checking the change in the imaging direction of an image capturing device which has captured the image of the storage compartment, when a change in the captured image is confirmed compared to a previously stored image; and performing an object recognition operation of the captured image when the imaging direction is maintained.

15 Claims, 14 Drawing Sheets

(51) Int. Cl.
*G06T 7/246* (2017.01)
*F25D 29/00* (2006.01)
*G06K 9/62* (2022.01)
*H04N 5/232* (2006.01)
*G06V 10/40* (2022.01)
*G06V 10/75* (2022.01)

(52) U.S. Cl.
CPC ............ *G06V 10/40* (2022.01); *G06V 10/758* (2022.01); *H04N 5/232* (2013.01); *F25D 2700/06* (2013.01); *G06T 2207/20084* (2013.01)

(58) Field of Classification Search
CPC ... F25D 2500/06; G06K 9/6217; G06T 7/246; G06T 2207/20084; G06T 2207/30128; G06T 7/254; G06T 7/0004; G06T 7/269; G06T 7/62; G06T 2207/20081; H04N 5/232; G06Q 10/087
USPC .......................................................... 382/103
See application file for complete search history.

(56) References Cited

U.S. PATENT DOCUMENTS

| | | | |
|---|---|---|---|
| 2016/0088262 | A1 | 3/2016 | Lee et al. |
| 2017/0154429 | A1* | 6/2017 | Moteki ..................... G06T 7/74 |
| 2017/0219276 | A1 | 8/2017 | Wang et al. |
| 2017/0234602 | A1* | 8/2017 | Seo .......................... F25D 11/00 348/151 |
| 2018/0172343 | A1 | 6/2018 | Grimminger et al. |
| 2020/0033937 | A1* | 1/2020 | Erivantcev .............. G06F 3/012 |

FOREIGN PATENT DOCUMENTS

| | | | |
|---|---|---|---|
| KR | 10-0479616 | B1 | 3/2005 |
| KR | 10-2006-0070969 | A | 6/2006 |
| KR | 10-2013-0067395 | A | 6/2013 |
| KR | 10-1697520 | B1 | 2/2017 |
| KR | 10-2017-0086165 | A | 7/2017 |
| KR | 10-1756620 | B1 | 7/2017 |
| KR | 10-2019-0108049 | A | 9/2019 |

OTHER PUBLICATIONS

Written Opinion of the International Searching Authority, PCT/ISA/237, dated Jan. 21, 2020, in corresponding International Patent Application No. PCT/KR2019/012645.

Jimenez-Hernandez, Hugo "Motion Detection on Fixed Cameras Subject to Vibration", DYNA, vol. 78, No. 168, Aug. 1, 2011, pp. 36-44, XP55818030.

Taylor Robert M. "Registering Oblique Image Pairs Without Camera Models." *University of Southern California Los Angeles* May 24, 1999, pp. 1-18.

European Search Report dated Jul. 9, 2021, in European Application No. 19869916.7.

European Examination Report for European Application No. 19 869 916.7 dated Mar. 30, 2022.

* cited by examiner

FIG. 5
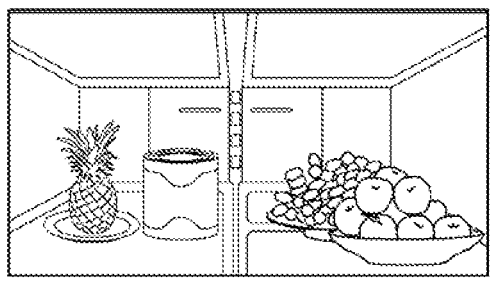 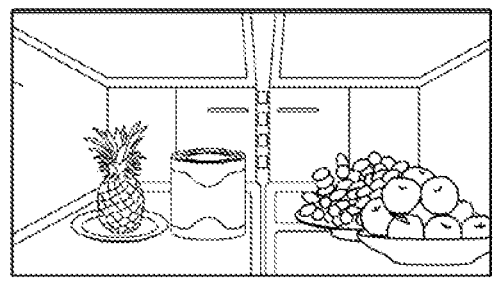
(a)          (b)
FIG. 5A          FIG. 5B

FIG. 6
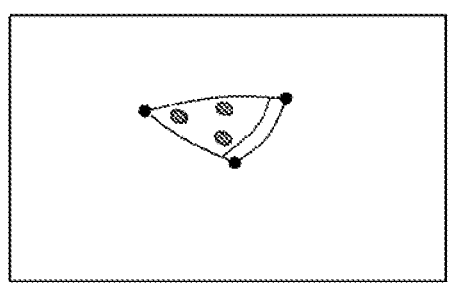
(a)
FIG. 6A
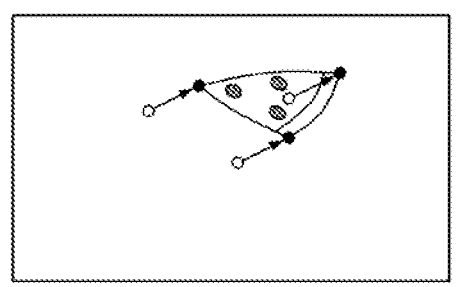
(b)
FIG. 6B

REFRIGERATOR, SERVER, AND OBJECT RECOGNITION METHOD OF REFRIGERATOR

CROSS-REFERENCE TO RELATED APPLICATIONS

This application is a U.S. National Stage Application which claims the benefit under 35 U.S.C. § 371 of International Patent Application No. PCT/KR2019/012645 filed on Sep. 27, 2019, which claims foreign priority benefit under 35 U.S.C. § 119 of Korean Patent Application 10-2018-0117133 filed on Oct. 1, 2018, in the Korean Intellectual Property Office, the contents of both of which are incorporated herein by reference.

TECHNICAL FIELD

The disclosure relates to a refrigerator, a server, and an object recognition method thereof, and more particularly to a refrigerator for identifying a change of an image capturing direction by comparing an original image and an image currently captured of the refrigerator, a server, and an object recognition method of a refrigerator.

BACKGROUND ART

A refrigerator may refer to an electronic apparatus (or home appliance) for keeping edible and drinkable foods refrigerated or frozen through a refrigeration cycle using a refrigerant. The refrigerator may also store medicine, alcoholic liquor, or cosmetics, in addition to the foods.

In recent years, a method for capturing an image of a storage compartment of a refrigerator and performing object recognition regarding the foods stored by using the captured image has been applied in order to manage the foods stored in the refrigerator. For this, the refrigerator may capture an image of the storage compartment by using a camera attached to a front surface of a door.

However, the impact may be applied to the door due to a plurality of times of opening and closing of the door by the user, and this may cause a change of an image capturing direction of the camera attached to the front surface of the door. When the camera captures an image of the storage compartment while the image capturing direction is changed, additional object recognition may be performed, by recognizing a significant change between an original image and the image currently captured, although there is no actual change in foods stored in the storage compartment. In this case, the additional object recognition described above had a problem of an increase in unnecessary cost due to the cost incurring due to use of resources when performing the object recognition.

DISCLOSURE

Technical Problem

An object of the disclosure is to provide a refrigerator for identifying a change of an image capturing direction by comparing an original image and an image currently captured of the refrigerator, a server, and an object recognition method of a refrigerator.

Technical Solution

In accordance with an aspect of the disclosure, there is provided an object recognition method of a refrigerator, the method including obtaining a captured image obtained by capturing a storage compartment of the refrigerator, based on a change of the captured image compared to a prestored original image being identified, identifying a change of an image capturing direction of an image capturing device which has captured the storage compartment, and based on the image capturing direction being maintained, performing an object recognition operation regarding the captured image.

In accordance with another aspect of the disclosure, there is provided a refrigerator including a storage compartment configured to store foods, an image capturing device configured to capture an image of the storage compartment, a memory configured to store an original image previously captured by the image capturing device, and a processor configured to obtain a captured image by capturing an image of the storage compartment by controlling the capturing device, based on a change of the captured image compared to the original image being identified, identify whether an image capturing direction of the image capturing device is changed, and based on the image capturing direction being maintained, perform an object recognition operation regarding the captured image.

In accordance with still another aspect of the disclosure, there is provided a server including a memory configured to store an original image previously received from a refrigerator, a communication device configured to receive a captured image obtained by capturing the storage compartment of the refrigerator from the refrigerator, and based on a change of the captured image compared to the original image being identified, identify whether an image capturing direction of the captured image is changed, and based on the image capturing direction being maintained, perform an object recognition operation regarding the captured image.

Effect of Invention

DESCRIPTION OF DRAWINGS

FIG. 5 is a diagram illustrating an example in which a change of an image capturing direction has occurred according to an embodiment;

FIGS. 6 to 9 are diagrams illustrating examples of methods for identifying a change of an image capturing direction using a plurality of feature points in an image according to an embodiment;

BEST MODE

Detailed Description of Exemplary Embodiments

Figure 1:
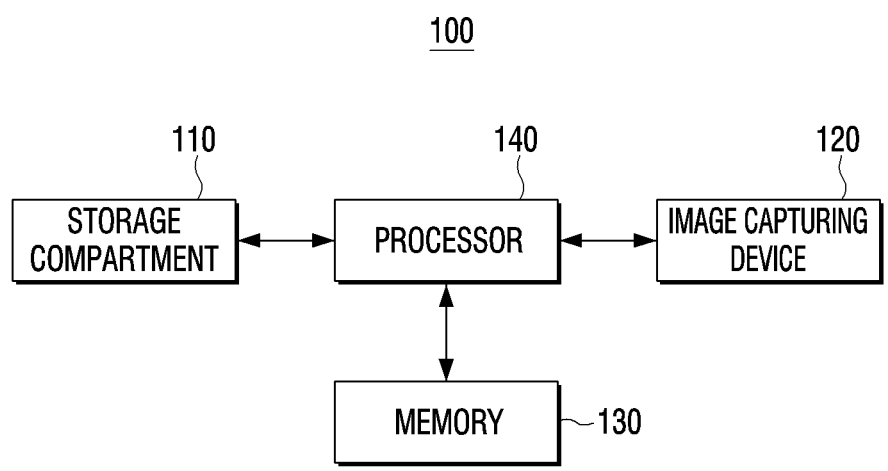
FIG. 1 is a block diagram for illustrating a specific configuration of a refrigerator according to an embodiment.

The disclosure will be described in greater detail below after briefly explaining the terms used in the disclosure.

The terms used in embodiments of the disclosure have been selected as widely used general terms as possible in consideration of functions in the disclosure, but these may vary in accordance with the intention of those skilled in the art, the precedent, the emergence of new technologies and the like. In addition, in a certain case, there may also be an arbitrarily selected term, in which case the meaning will be described in the description of the disclosure. Therefore, the terms used in the disclosure should be defined based on the meanings of the terms themselves and the contents throughout the disclosure, rather than the simple names of the terms.

The embodiments of the disclosure may be variously changed and include various embodiments, and specific embodiments will be shown in the drawings and described in detail in the description. However, it should be understood that this is not to limit the scope of the specific embodiments and all modifications, equivalents, and/or alternatives included in the disclosed spirit and technical scope are included. In describing the disclosure, a detailed description of the related art may be omitted when it is determined that the detailed description may unnecessarily obscure a gist of the disclosure.

The terms "first," "second," or the like may be used for describing various elements but the elements may not be limited by the terms. The terms are used only to distinguish one element from another.

Unless otherwise defined specifically, a singular expression may encompass a plural expression. It is to be understood that the terms such as "comprise" or "consist of" are used herein to designate a presence of characteristic, number, step, operation, element, part, or a combination thereof, and not to preclude a presence or a possibility of adding one or more of other characteristics, numbers, steps, operations, elements, parts or a combination thereof.

Hereinafter, with reference to the accompanying drawings, embodiments of the disclosure will be described in detail for those skilled in the art to easily practice the embodiments. But, the disclosure may be implemented in various different forms and is not limited to the embodiments described herein. In addition, in the drawings, the parts not relating to the description are omitted for clearly describing the disclosure.

Hereinafter, the disclosure will be described in more detail with reference to the drawings.

FIG. 1 is a block diagram for illustrating a specific configuration of a refrigerator according to an embodiment.

Referring to FIG. 1, a refrigerator 100 may include a storage compartment 110, an image capturing device 120, a memory 130, and a processor 140.

The storage compartment 110 may be a place arranged inside the refrigerator 100 for storing foods. The storage compartment 110 may be used as a refrigerator compartment which is maintained at approximately 0 to 5 degrees Celsius to refrigerate and store foods, and a freezer compartment which is maintained at approximately minus 30 to 0 degrees Celsius to freeze and store foods.

The storage compartment 110 may have a front surface open so that foods are put in and taken out and the open front surface thereof may be opened and closed by a door (not illustrated). A shelf for placing the foods may be disposed in the storage compartment 110.

The image capturing device 120 may obtain a captured image of a predetermined region corresponding to an image capturing direction. Specifically, the image capturing device 120 may be disposed on one side surface of a door facing the storage compartment 110 to have the image capturing direction towards the storage compartment 110. In addition, the image capturing device 120 may obtain the captured image of the predetermined region in the storage compartment 110 corresponding to the image captured direction.

The image capturing direction herein may be a direction in which a lens of the image capturing device 120 faces. An image formed through a lens may change according to a change of the image capturing direction. Accordingly, when the image capturing direction changes, the predetermined region corresponding thereto may also change. The predetermined region herein may refer to a unique detection region detectable by the image capturing device 120 through the lens.

The number of image capturing devices 120 may be more than one and the plurality of image capturing devices may obtain captured images of a plurality of predetermined regions respectively corresponding to a plurality of image capturing directions. Specifically, the image capturing devices 120 may be disposed at predetermined intervals on the one side surface side of the door facing the storage compartment 110 and may obtain captured images of the plurality of predetermined regions respectively corresponding to the plurality of image capturing directions in the storage compartment 110.

The image capturing device 120 may obtain the captured image in the predetermined region when a predetermined event occurs. The predetermined event herein may correspond to a turn-on event of the refrigerator 100, a predetermined cycle reaching event, or a door closing event of the refrigerator 100 and is not limited to the above examples.

The memory 130 may store various pieces of data for general operations of the refrigerator 100 such as a program for processing or controlling the processor 140. Specifically, the memory 130 may store a plurality of application programs operated in the refrigerator 100 and data and instructions for operations of the refrigerator 100.

In addition, the memory 130 may be accessed by the processor 140 and reading, recording, editing, deleting, or updating of the data by the processor 140 may be executed. The memory 130 may be implemented as a removable disk including an external storage medium or a USB memory, a web server via a network, and the like, in addition to the storage medium in the refrigerator 100.

The memory 130 may store an image captured by the image capturing device 120. Specifically, the memory 130 may store an image obtained by capturing the inside of the storage compartment 110 by the image capturing device 120.

The processor 140 may perform control with respect to each element in the refrigerator 100. Specifically, an instruction regarding a specific function is received, the processor 140 may control operations of the element related to the corresponding function.

The processor 140 may perform object recognition regarding the foods accommodated in the storage compartment 110 of the refrigerator. Specifically, the processor 140 may perform object recognition using a captured image of the storage compartment 100 captured by the image capturing device 120. For example, the processor 140 may analyze the captured image to identify a type of the food accommodated in the storage compartment 110, the number of foods, an accommodation time point, expiration date information, and the like.

However, if the processor 140 performs the object recognition with respect to all of the captured images which are captured by the image capturing device 120, a significantly large amount of operation is required. Accordingly, the processor 140 may determine whether it is necessary to perform the object recognition with respect to each captured image before performing the object recognition with respect to the image currently captured.

In the related art, the processor 140 compared images captured in sequence, and when it was identified that a change region was generated in the captured image, the processor determined that a change of an object has occurred and determined to perform the object recognition. In addition, when it was not identified that the change region was not generated, the processor 140 identified that a change of an object has not occurred and determined not to perform the object recognition.

However, a user may apply an impact to the image capturing device 120 by opening or closing the door of the refrigerator multiple times and the image capturing direction of the image capturing device 120 may slightly change accordingly. In this case, although there is no actual change of the foods accommodated in the storage compartment 110, the change region may be generated in the captured image due to the change of the image capturing direction.

In other words, there was a problem that, although a result of the object recognition regarding each of the images captured in sequence was calculated in the same manner, the processor 140 determined that it is necessary to perform the object recognition.

For example, referring to FIG. 5, an example in which the change of the image capturing direction has occurred may be identified. Specifically, referring to the images of FIGS. 5A and 5B, it may be identified that a pineapple, a can, grapes, and apples are accommodated in the storage compartment 110 and there is no actual change of the number or position of each of the objects. Accordingly, an object recognition result of FIG. 5A and an object recognition result of FIG. 5B may be the same.

However, it may be identified that the image capturing direction of FIG. 5B is slightly different from the image capturing direction of FIG. 5A. For example, it may be identified from FIG. 5B that a right edge of a bowl with the apples is not captured. If the image capturing direction is changed as described above, when each pixel of the image of FIG. 5A is compared with each pixel of the image of FIG. 5B corresponding thereto, a change between the values occurs. Accordingly, FIGS. 5A and 5B may be determined as images different from each other so as to perform unnecessary object recognition.

In order to solve such a problem, the processor 140 may determine whether to perform the object recognition by additionally identifying whether the image capturing direction is changed. Specifically, the processor 140 may determine whether to perform the object recognition by additionally identifying whether the object of the captured image is moved and the image capturing direction is changed.

More specifically, the processor 140 may analyze a case corresponding to each captured image from among a case where the object movement has occurred and the change of the image capturing direction has also occurred (①), a case where the object movement has occurred but the change of the image capturing direction has not occurred (②), a case where the object movement has not occurred but the change of the image capturing direction has occurred (③), and a case where both the object movement and the change of the image capturing direction have not occurred (④).

In addition, if the captured image corresponds to the cases ① and ② from among the plurality of cases described above, the processor 140 may determine to perform the object recognition, since the object movement has occurred. If the captured image corresponds to the case ④, the processor 140 may determine not to perform the object recognition, since the change has not occurred in the captured image. In addition, if the captured image corresponds to the case ③, the processor 140 may determine not to perform the object recognition, since the movement of the object has not substantially occurred.

In the related art, although the captured image corresponded to the case ③, the processor 140 performed the object recognition, whereas in the disclosure, if the captured image corresponds to the case ③, the processor 140 may determine not to perform the object recognition, thereby exhibiting an effect of reducing operation due to the additional object recognition. A specific operation of the processor 140 regarding the determination whether it is necessary to perform the object recognition will be described hereinafter.

First, the processor 140 may obtain the captured image by controlling the image capturing device 120. Specifically, the processor 140 may obtain the captured image by controlling the image capturing device 120 so as to capture the image of the inside of the storage compartment 110. The processor 140 may store the obtained captured image in the memory 130.

In addition, the processor 140 may identify whether a change region of the captured image is generated, by comparing the obtained captured image with an original image. The original image herein may refer to the captured image obtained by capturing the image of the inside of the storage compartment 110 by the image capturing device 120 previously. In addition, the original image may be an image obtained most recently from among a plurality of captured images obtained previously.

Specifically, the processor 140 may detect a pixel value change region by comparing each pixel value of the original image with each pixel value of the captured image corresponding thereto, to identify whether a change region of the captured image is generated.

If the pixel value change region is not detected, this may imply that the original image is the same image as the captured image. In other words, it implies that this case corresponds to the case where both the object movement and the change of the image capturing direction have not occurred (④) from among the four cases described above, and accordingly, the processor 140 may determine not to perform the object recognition with respect to the captured image.

On the other hand, if the pixel value change region is detected, the processor 140 may identify a size of the detected region and determine whether to perform the object recognition or identify whether the image capturing direction is additionally changed according to whether the size thereof exceeds a predetermined size.

Specifically, if the size of the change region does not exceed the predetermined size, it implies that the change region is generated only in a local region from the captured image. If the change of the image capturing direction has occurred, the change region of the captured image is generated over the entire area, not in the local region. Accordingly, if the size of the change region does not exceed the predetermined size, the processor 140 may determine that there is no change of the image capturing direction and determined that the generated change region is due to the movement of the object.

In other words, if the size of the change region does not exceed the predetermined size, the pixel value change region of the captured image is caused by the actual movement of the object, and accordingly, the captured image may correspond to the case where the object movement has occurred but the change of the image capturing direction has not occurred (②) from among the four types of the cases described above. Accordingly, the processor 140 may determine to perform the object recognition with respect to the captured image.

As described above, if the size of the change region does not exceed the predetermined size, the processor 140 may determine to perform the object recognition without identifying the change of the image capturing direction, thereby exhibiting the effect of reducing the operation.

On the other hand, if the size of the change region exceeds the predetermined size, there is a possibility of occurrence of the change of the image capturing direction not only the possibility of the occurrence of the actual change of the object, and accordingly, the processor 140 may additionally identify whether the image capturing direction is changed.

If it is identified that the image capturing direction is not changed, the pixel value change region of the captured image is caused by the actual movement of the object, and accordingly, this may correspond to the case where the change of the foods accommodated in the storage compartment 110 has actually occurred. In other words, the captured image corresponds to the case where the object movement has occurred but the change of the image capturing direction has not occurred (②) from among the four types of the cases described above, and accordingly, the processor 140 may determine to perform the object recognition with respect to the captured image.

On the other hand, if it is identified that the image capturing direction is changed, the processor 140 may determine to perform the object recognition according to whether the movement of the object has occurred. Specifically, the processor 140 may determine to perform the object recognition in the case where the object movement has occurred and the change of the image capturing direction has also occurred (①).

On the other hand, the case where the object movement has not occurred but the change of the image capturing direction has occurred (③) implies that the pixel value change region of the captured image is not caused by the actual change of the foods accommodated in the storage compartment 110, but is caused by the change of the image capturing direction, and accordingly, the processor 140 may determine not to perform the object recognition.

Meanwhile, the specific description regarding identifyation whether the change of the image capturing direction and the object movement has occurred will be described later with reference to FIGS. 6 to 10.

The processor 140 may store the captured image in the memory 130 by replacing with the original image stored in the memory 130 and may use the captured image as a comparison target when determining whether to perform the object recognition with respect to an image captured later.

In addition, when it is determined to perform the object recognition, the processor 140 may perform the object recognition using the captured image. The processor 140 may display an object recognition result via a display to the user.

On the other hand, if it is determined not to perform the object recognition, the processor 140 may use a result of the object recognition previously performed using the original image again. In other words, when it is determined that the change between the captured image and the original image has not occurred or it is determined that the change of the image capturing direction has occurred, the processor 140 may use the object recognition result regarding the original image.

Meanwhile, in illustrating and describing FIG. 1, it is illustrated and described that the image capturing device is provided in the refrigerator, but the image capturing device may be provided as a separate device from the refrigerator in the implementation. In this case, the image capturing device may be implemented by a method for capturing an image of the storage compartment of the refrigerator by attaching to the refrigerator, transmitting the captured image to the refrigerator via wired or wireless communication, and performing the object recognition using the captured image received by the refrigerator. In addition, the image capturing device may store all of the original image and the captured image obtained by capturing the storage compartment of the refrigerator and may directly identify whether the image capturing direction of the captured image is changed. The image capturing device may perform the object recognition operation according to the result of the image capturing direction change. The operation described above may also be performed on other external devices, in addition to the image capturing device.

Hereinabove, it is illustrated and described only regarding the brief configuration configuring the refrigerator, but various elements may be additionally provided in the implementation. This will be described below with reference to FIG. 2.

Figure 2:
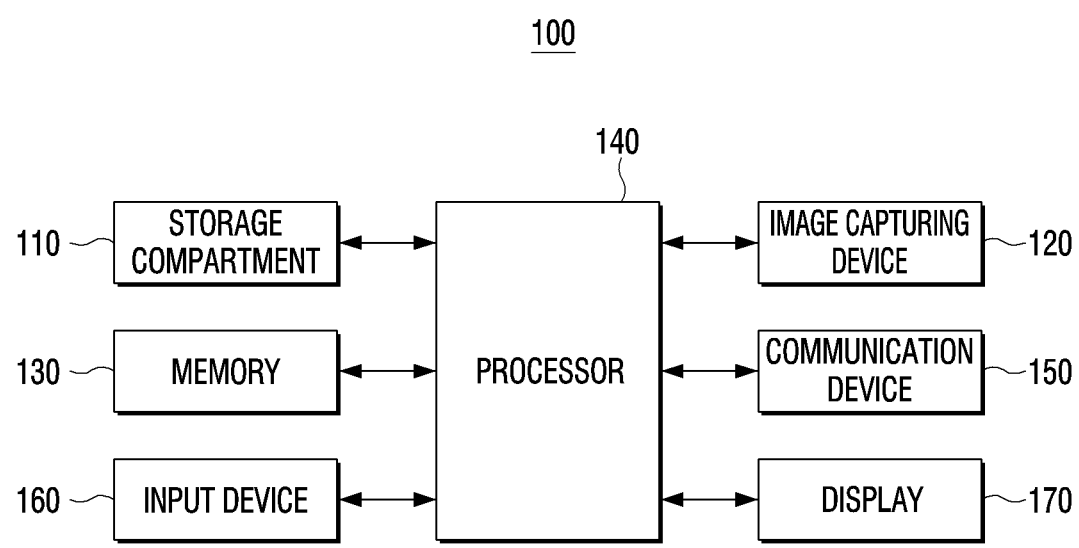
FIG. 2 is a block diagram illustrating a specific configuration of a refrigerator according to an embodiment.

FIG. 2 is a block diagram illustrating a specific configuration of a refrigerator according to an embodiment.

Referring to FIG. 2, the refrigerator 100 according to an embodiment of the disclosure may be configured with the storage compartment 110, the image capturing device 120, the memory 130, the processor 140, a communication device 150, an input device 160, and a display 170.

The storage compartment 110, the image capturing device 120, the memory 130, and the processor 140 perform the same functions as the elements of FIG. 1 and therefore the overlapped description will not be repeated.

The communication device 150 may be connected to an external device (not illustrated) to transmit and receive various pieces of data to and from the external device. Specifically, the communication device 150 may also be connected via a universal serial bus (USB) port or a wireless communication (e.g., Wi-Fi 802.11a/b/g/n, near field communication (NFC), or Bluetooth) port, in addition to the connection to the external device via a local area network (LAN) or the Internet. The external device may be a PC, a laptop, a smartphone, a server, and the like.

The communication device 150 may transmit the image captured by the image capturing device 120 to the external device. Specifically, the communication device 150 may transmit the captured image of the predetermined region in the storage compartment 110 to the external device. The external device may perform the object recognition using the received captured image and transmit the object recognition result to the communication device 150 again.

In this case, the processor 140 may display the object recognition result received from the external device via the display 170 to the user, without performing the object recognition with respect to the captured image directly. Meanwhile, the specific description regarding the operation of obtaining the result of the object recognition through the communication with the external device will be described later with reference to FIGS. 13 and 14.

The input device 160 may include a plurality of function keys for setting or selecting various functions supported by the refrigerator 100 by the user. With this, the user may input various operation commands regarding the refrigerator 100. For example, the user may input a command regarding a cooling strength of the refrigerator via the input device 160.

In addition, the input device 160 may receive information regarding the foods accommodated in the storage compartment 110 as a feedback of the user regarding the object recognition result. For example, if the user puts newly purchased grapes into the storage compartment 110, the grapes may be newly recognized as the object recognition result and the user may input information related to the foods such as expiration date information regarding the newly recognized grapes.

The display 170 may display various pieces of information provided from the refrigerator 100. Specifically, the display 170 may display an operation state of the refrigerator 100 or display a user interface window for a function selected by the user or option selection. The display 170 may be implemented in a form of a touch screen for simultaneously performing the function of the input device 160.

In addition, the display 170 may display the result of the object recognition performed by the processor 140 or the result of the object recognition of the external device received via the communication device 150. For example, the information regarding a food name, a category of the food, an initial accommodation time point, an accommodation position, and the like of the grapes accommodated in the storage compartment 110 may be displayed.

In the related art, even in a case where the image capturing direction of the image capturing device was changed, the refrigerator performed the object recognition with respect to the captured image. In this case, although there was no actual change of the foods accommodated in the storage compartment, there was a problem that a large amount of operation was necessary due to the additional object recognition by the refrigerator due to the occurrence of the change of the captured image.

In contrast, as described above, the refrigerator according to the embodiment may identify whether the image capturing direction is changed by comparing the captured image and the original image, and when it is identified that the change of the image capturing direction has simply occurred, the refrigerator may determine not to perform the additional object recognition, thereby exhibiting an effect of reducing operation.

Figure 3:
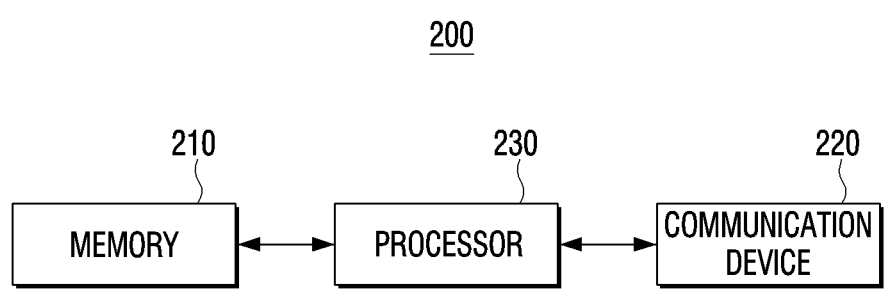
FIG. 3 is a block diagram illustrating a specific configuration of a server according to an embodiment.

FIG. 3 is a block diagram illustrating a specific configuration of a server according to an embodiment.

Referring to FIG. 3, a server 200 may include a memory 210, a communication device 220, and a processor 230.

The memory 210 may store various pieces of data for general operations of the server 200 such as programs for process or control of the processor 230. Specifically, the memory 210 may store a plurality of application programs operated in the server 200 and data and instructions for operations of the server 200.

In addition, the memory 210 may be accessed by the processor 230 and reading, recording, editing, deleting, or updating of the data by the processor 230 may be executed. The memory 210 may be implemented as a removable disk including an external storage medium or a USB memory, a web server via a network, and the like, in addition to the storage medium in the server 200.

In addition, the memory 210 may store the captured image received via the communication device 220. Specifically, the memory 210 may store the captured image of the predetermined region in the storage compartment received from the refrigerator 100 via the communication device 220.

The communication device 220 may be connected to an external device (not illustrated) to transmit and receive various pieces of data to and from the external device. Specifically, the communication device 220 may also be connected via a universal serial bus (USB) port or a wireless communication (e.g., Wi-Fi 802.11a/b/g/n, near field communication (NFC), or Bluetooth) port, in addition to the connection to the external device via a local area network (LAN) or the Internet. The external device may be a refrigerator, a PC, a laptop, a smartphone, a server, and the like.

In addition, the communication device 220 may receive the captured image of the predetermined region in the storage compartment from the refrigerator 100.

The processor 230 may perform control of each element in the server 200. Specifically, when a command regarding a specific function is received, the processor 230 may control the operation of the element related to the corresponding function.

In addition, the processor 230 may perform the object recognition regarding the foods accommodated in the refrigerator 100 using the received captured image. However, when the processor 230 performs the object recognition with respect to all of the received captured images, a significantly large amount of operation is required. Accordingly, the processor 230 may determine whether it is necessary to perform the object recognition before performing the object recognition with respect to the captured image currently received.

Specifically, the processor 230 may determine whether to perform the object recognition by identifying both the object movement of the captured image and change of the image capturing direction.

More specifically, the processor 230 may analyze a case corresponding to each captured image from among a case where the object movement has occurred and the change of the image capturing direction has also occurred (①), a case where the object movement has occurred but the change of the image capturing direction has not occurred (②), a case where the object movement has not occurred but the change of the image capturing direction has occurred (③), and a case where both the object movement and the change of the image capturing direction have not occurred (④).

In addition, if the captured image corresponds to the cases ① and ② from among the plurality of cases described above, the processor 230 may determine to perform the object recognition, since the object movement has occurred. If the captured image corresponds to the case ④, the processor 230 may determine not to perform the object recognition, since the change has not occurred in the captured image. In addition, if the captured image corresponds to the case ③, the processor 230 may determine not to perform the object recognition, since the movement of the object has not substantially occurred. A specific operation of the processor 230 regarding the determination whether it is necessary to perform the object recognition will be described hereinafter.

First, the processor 230 may obtain the captured image of the refrigerator 100 via the communication device 220. The processor 230 may store the obtained captured image in the memory 210.

In addition, the processor 230 may identify whether a change of the captured image has occurred, by comparing the obtained captured image with an original image. The original image herein may refer to the captured image obtained by capturing the image of the inside of the refrigerator 100 that is received via the communication device 220 previously. In addition, the original image may be an image obtained most recently from among a plurality of captured images received previously.

Specifically, the processor 230 may detect a pixel value change region by comparing each pixel value of the original image with each pixel value of the captured image corresponding thereto, thereby identifying whether a change of the captured image has occurred.

If the pixel value change region is not detected, this implies that this case corresponds to the case where both the object movement and the change of the image capturing direction have not occurred (④) from among the four cases described above, and accordingly, the processor 230 may determine not to perform the object recognition with respect to the captured image.

On the other hand, if the pixel value change region is detected, the processor 230 may identify a size of the detected region and determine whether to perform the object recognition or identify whether the image capturing direction is additionally changed according to whether the size thereof exceeds a predetermined size.

Specifically, if the size of the change region does not exceed the predetermined size, it implies that the change region is generated only in a local region from the captured image. If the change of the image capturing direction has occurred, the change region of the captured image is generated over the entire area, not in the local region. Accordingly, if the size of the change region does not exceed the predetermined size, the processor 230 may determine that there is no change of the image capturing direction and determine that the generated change region is due to the movement of the object.

In other words, if the size of the change region does not exceed the predetermined size, the pixel value change region of the captured image is caused by the actual movement of the object, and accordingly, the captured image may correspond to the case where the object movement has occurred but the change of the image capturing direction has not occurred (②) from among the four types of the cases described above. Accordingly, the processor 230 may determine to perform the object recognition with respect to the captured image.

As described above, if the size of the change region does not exceed the predetermined size, the processor 230 may determine to perform the object recognition without identifying the change of the image capturing direction, thereby exhibiting the effect of reducing the operation.

On the other hand, if the size of the change region exceeds the predetermined size, there is a possibility of occurrence of the change of the image capturing direction not only the possibility of the occurrence of the actual change of the object, and accordingly, the processor 230 may additionally identify whether the image capturing direction is changed.

If it is identified that the image capturing direction is not changed, the pixel value change region of the captured image is caused by the actual movement of the object, and accordingly, this may correspond to the case where the change of the foods accommodated in the refrigerator 100 has actually occurred. In other words, the captured image corresponds to the case where the object movement has occurred but the change of the image capturing direction has not occurred (②) from among the four types of the cases described above, and accordingly, the processor 230 may determine to perform the object recognition with respect to the captured image.

On the other hand, if it is identified that the image capturing direction is changed, the processor 230 may determine to perform the object recognition according to whether the movement of the object has occurred. Specifically, the processor 230 may determine to perform the object recognition in the case where the object movement has occurred and the change of the image capturing direction has also occurred (①).

On the other hand, the case where the object movement has not occurred but the change of the image capturing direction has occurred (③) implies that the pixel value change region of the captured image is not caused by the actual change of the foods accommodated in the refrigerator 100, but is caused by the change of the image capturing direction, and accordingly, the processor 230 may determine not to perform the object recognition.

Meanwhile, the specific description regarding the identifyation whether the change of the image capturing direction and the object movement occur will be described later with reference to FIGS. 6 to 10.

In this case, the processor 230 may store the captured image in the memory 210 by replacing with the original image stored in the memory 210 and may use the captured image as a comparison target when determining whether to perform the object recognition with respect to the captured image received later.

In addition, when it is determined to perform the object recognition, the processor 230 may perform the object recognition using the captured image. The processor 230 may transmit the object recognition result to the refrigerator 100 via the communication device 220.

On the other hand, if it is determined not to perform the object recognition, the processor 230 may use a result of the object recognition previously performed using the original image again. In other words, when it is determined that the change between the captured image and the original image has not occurred or it is determined that the change of the image capturing direction has occurred, the processor 230 may transmit the object recognition result regarding the original image to the refrigerator 100 via the communication device 220.

Meanwhile, in illustrating and describing FIG. 3, it is illustrated and described that the captured image is received from the refrigerator, but the captured image may be received from a separate image capturing device which has captured the refrigerator in the implementation.

Hereinabove, it is illustrated and described only regarding the brief configuration configuring the server, but various elements may be additionally provided in the implementation. This will be described below with reference to FIG. 4.

Figure 4:
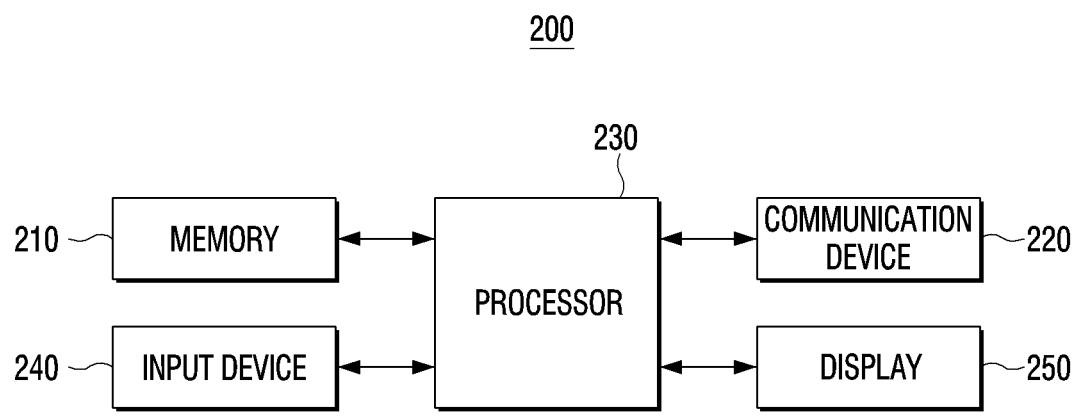
FIG. 4 is a block diagram illustrating a specific configuration of a server according to an embodiment.

FIG. 4 is a block diagram illustrating a specific configuration of a server according to an embodiment.

Referring to FIG. 4, the server 200 may be configured with the memory 210, the communication device 220, the processor 230, an input device 240, and a display 250.

The memory 210, the communication device 220, and the processor 230 perform the same functions as the elements of FIG. 3 and therefore the overlapped description will not be repeated.

The input device 240 may include a plurality of function keys for setting or selecting various functions supported by the server 200. With this, the user may input various operation commands regarding the server 200.

In addition, the input device 240 may receive an input through a menu displayed on the display 250. In addition, the input device 240 may be implemented as a plurality of buttons, a keyboard, a mouse, and the like and may also be implemented as a touch screen for simultaneously performing the function of the display 250 which will be described later.

The display 250 may display various messages provided from the server 200. For example, the display 250 may display a user interface window for selecting various functions provided by the server 200. The display 250 may be a monitor such as an LCD, a CRT, an OLED, and the like or may be implemented as a touch screen for simultaneously performing the function of the input device 240 which will be described later.

In the related art, even in a case where the image capturing direction of the received captured image was changed, the server performed the object recognition with respect to the captured image. In this case, although there was no actual change of the foods accommodated in the refrigerator, there was a problem that a large amount of operation was necessary due to the additional object recognition by the server due to the occurrence of the change of the captured image.

In contrast, as described above, the server according to the embodiment may identify whether the image capturing direction is changed by comparing the captured image and the original image, and when it is identified that the change of the image capturing direction has simply occurred, the server may determine not to perform the additional object recognition, thereby exhibiting the effect of reducing operation.

FIGS. 6 to 9 are diagrams illustrating examples of methods for identifying a change of an image capturing direction using a plurality of feature points according to an embodiment.

The processor 140 or 230 of the refrigerator or the server may identify whether the image capturing direction is changed based on a position change of a plurality of feature points between the original image and the captured image according to an optical flow method. The specific operation regarding this will be described below.

FIG. 6 is a diagram illustrating an example of the position change of the plurality of feature points in the image according to an embodiment. FIG. 6A corresponds to the original image and FIG. 6B corresponds to the captured image.

First, the processor 140 or 230 may identify a plurality of feature points in the original image and detect a plurality of feature points corresponding thereto from the captured image.

Specifically, referring to FIG. 6A, it may be identified that an image of a fan-shaped piece of pizza is positioned in the original image and three black points are displayed at edge parts of the fan shape.

Referring to FIG. 6B, it may be identified that the position of the fan-shaped piece of pizza is moved to the upper right side in the captured image and the three black points of the edge parts of the fan shape are also moved to the upper right side.

The point displayed herein may refer to a feature point of the object in the image which is a point such as a corner or an end point of a segment with a feature for distinguishing from a background or another object. The feature point may be configured with two-dimensional coordinates and the feature point of the captured image which is a three-dimensional image may be configured with three-dimensional coordinates.

In other words, the processor 140 or 230 may identify the plurality of feature points from the original image of FIG. 6A and detect the plurality of feature points corresponding to the plurality of feature points of the original image from the captured image of FIG. 6B.

Meanwhile, the processor 140 or 230 may identify the plurality of feature points from the original image but may not observe a plurality of feature points corresponding to the plurality of feature points of the original image from the captured image. This case may correspond to a case where it is difficult to observe the plurality of feature points corresponding to the plurality of feature points of the original image from the captured image according to the movement of the object that is able to be identified from the original image.

Accordingly, when it is difficult to identify the plurality of feature points corresponding to the plurality of feature points of the original image from the captured image, the processor 140 or 230 may determine that the change has occurred regarding the object and determine that the image capturing direction is not changed.

Specifically, the processor 140 or 230 may identify the number of the plurality of feature points of the original image and the number of the plurality of feature points of the captured image, and if a change ratio of the number of feature points exceeds a preset threshold ratio, the processor 140 or 230 may determine that the image capturing direction is not changed.

For example, if 10 feature points are identified from the original image but only 5 feature points are identified from the captured image, the processors may determine that the object corresponding to the 5 feature points not identified is moved and determine that the image capturing direction is not changed.

If the plurality of feature points corresponding to the plurality of feature points of the original image are detected from the captured image, the processor 140 or 230 may distinguish whether the object in the image is moved or the image capturing direction is changed by comparing a movement distance and a movement direction of each of the plurality of feature points of the original image and the plurality of feature points of the captured image. This will be described below with reference to FIGS. 7 to 9.

Figure 7:
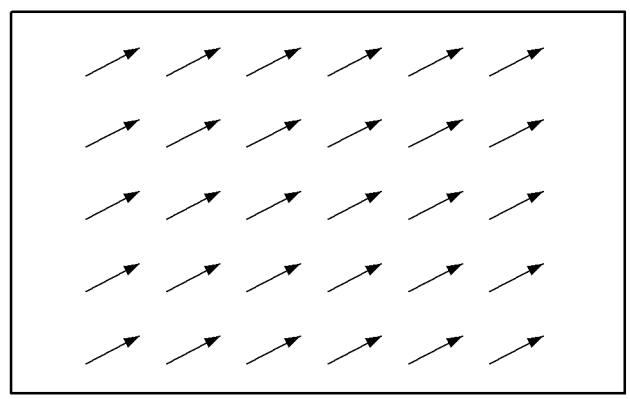
Figure 8:
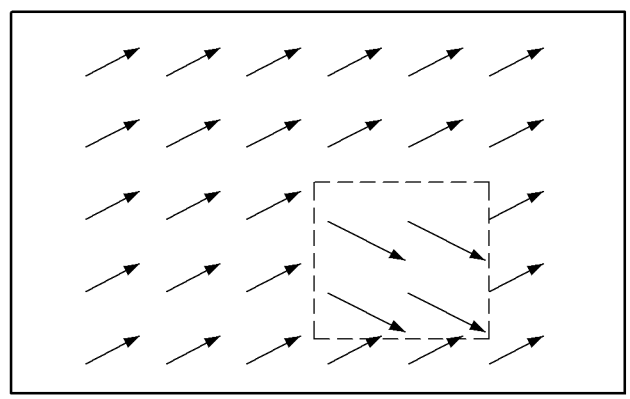
Figure 9:
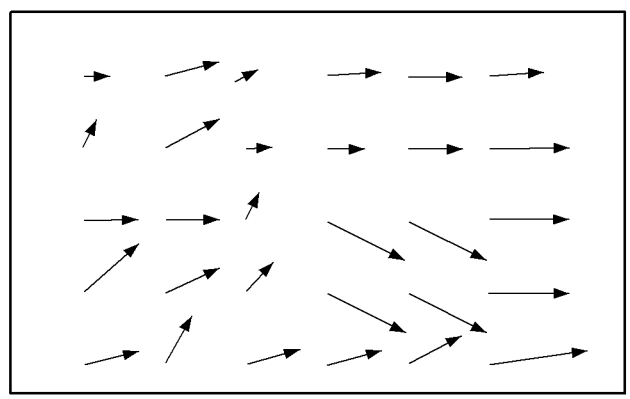

FIGS. 7 to 9 are diagrams illustrating an example of the movement distance and the movement direction of the plurality of feature points in the captured image according to an embodiment. Herein, a direction of an arrow may correspond to the movement direction of each feature point and a length of the arrow may correspond to the movement distance of each feature point.

Referring to FIG. 7, it may be identified that all of the arrows of the plurality of feature points of the captured image have the same direction and the same length. In other words, it may be identified that the plurality of feature points of the captured image are moved along the same movement direction and the same movement distance.

In this case, the processor 140 or 230 may determine that the captured image may correspond to the case where the object movement has not occurred but the change of the image capturing direction has occurred (③). Accordingly, the processor 140 or 230 may determine not to perform the object recognition.

Referring to FIG. 8, it may be identified that the arrows in a square region shown with a dotted line from the captured image are in a lower right direction, whereas the arrows in the remaining region are in an upper right direction. In this case, the processor 140 or 230 may determine that the object corresponding to the feature points in the square area with the dotted line is moved and the image capturing direction is maintained.

In other words, the processor 140 or 230 may determine that the captured image correspond to the case where the object movement has occurred and the change of the image capturing direction has also occurred (①). Accordingly, the processor 140 or 230 may determine to perform the object recognition.

Referring to FIG. 9, it may be identified that the movement directions and the movement distances of the plurality of feature points of the captured image may be different from each other. In this case, the processor 140 or 230 may determine that the object is moved and the image capturing direction is maintained.

In other words, the processor 140 or 230 may determine that the captured image may correspond to the case where the object movement has occurred but the change of the image capturing direction has not occurred (②). Accordingly, the processor 140 or 230 may determine to perform the object recognition.

As described above, the processor 140 or 230 may identify whether the movement of the object has occurred or the image capturing direction is changed by comparing the movement distances and the movement directions of each of the feature points as described above. Meanwhile, in order to compare the movement distances and the movement directions, the processor 140 or 230 may calculate a coordinate change amount of each of the plurality of feature points of the captured image by comparing the pixel coordinate values between each of the plurality of feature points of the original image and the plurality of feature points of the captured image.

In addition, the processor 140 or 230 may calculate the movement distance and the movement direction of each of the plurality of feature points of the captured image by using the calculated coordinate change amount and identify whether the image capturing direction is changed based on the calculated movement distance and movement direction.

If the coordinate change amount calculated herein is (x,y), the movement distance may be $\sqrt{x^2+y^2}$ and the movement direction may be calculated as y/x which is calculated in a form of a tilt. Alternatively, the movement direction may be calculated as $$\theta = \tan^{-1}\left(\frac{y}{x}\right)$$

which is calculated in a form of an angle.

Specifically, when the calculated movement distances and movement directions of the plurality of feature points of the captured image coincide within a predetermined error range, the processor 140 or 230 may determine that the image capturing direction is changed.

On the other hand, when a movement distance or a movement direction of at least one feature point of the plurality of feature points of the captured image have a difference beyond the predetermined error range, the processor 140 or 230 may determine that the image capturing direction is maintained.

In addition, the predetermined error range may refer to a range that is included in an error range when capturing the image by the image capturing device, although there is a certain difference in the movement distance and movement direction of each of the plurality of feature points.

As described above, the processor 140 or 230 may identify whether the image capturing direction is changed based on the change of the positions of the plurality of feature points between the original image and the captured image.

Figure 10:
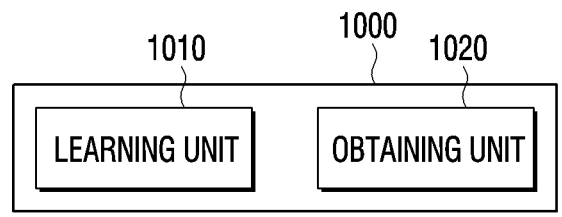
FIG. 10 is a diagram illustrating an example of a method for identifying a change of an image capturing direction using an artificial intelligence model according to an embodiment.

FIG. 10 is a diagram illustrating an example of a method for identifying a change of an image capturing direction using an artificial intelligence model according to an embodiment.

The processor 140 or 230 of the refrigerator or the server may identify whether the image capturing direction is changed by using an artificial intelligence model, in addition to the method using the plurality of feature points. The specific operation regarding this will be described below.

Referring to FIG. 10, a processor 1000 may include at least one of a learning unit 1010 and an obtaining unit 1020. The processor 1000 of FIG. 10 may correspond to the processor 140 of the refrigerator 100, the processor 230 of the server 200, or a processor of a data learning server (not illustrated).

The learning unit 1010 may generate or train a model for identifying the change of the image capturing direction. Specifically, the learning unit 1010 may generate an artificial intelligence model for identifying the change of the image capturing direction using collected learning data.

The artificial intelligence model herein may be configured with machine learning and elementary technologies using the machine learning. The machine learning may refer, for example, to an algorithm technology of self-classifying/self-training features of input data, and the elementary technology may refer, for example, to a technology of simulating functions of the human brain such as recognition or determination using the machine learning algorithm such as the deep learning and includes technical fields of language understanding, visual understanding, inference/prediction, knowledge representation, operation control, and the like.

In addition, the artificial intelligence model may correspond to a convolutional neural network (CNN), a recurrent neural network (RNN), a convolutional recurrent neural network (CRNN), and the like and is not limited to the above examples.

The learning data herein may correspond to a group of images of the same object which are captured by slightly moving upwards, downwards, to the left or right, or a group of images of the same image which are slightly cut in upward, downward, left or right direction. Meanwhile, the learning data is not limited to the above examples.

In other words, the learning unit 1010 may generate or train the model for identifying the change of the image capturing direction by using the group of images with the changed image capturing direction which are learning data as input data.

The obtaining unit 1020 may identify the change of the image capturing device by using the original image and the captured image as input data of the trained model.

As described above, the processor 1000 may generate the artificial intelligence model for identifying the change of the image capturing direction through the learning unit 1010 and identify the change of the image capturing direction of the currently captured image by using the artificial intelligence model through the obtaining unit 1020.

Meanwhile, the learning unit 1010 and the obtaining unit 1020 may be mounted on one electronic device such as a server or may be mounted on separate electronic devices, respectively. For example, the learning unit 1010 may be mounted on a data learning server and the obtaining unit 1020 may be mounted on the server 200 or the refrigerator 100. In this case, model information constructed by the learning unit 1010 may be provided to the obtaining unit 1020 by using wired or wireless communication.

Figure 11:
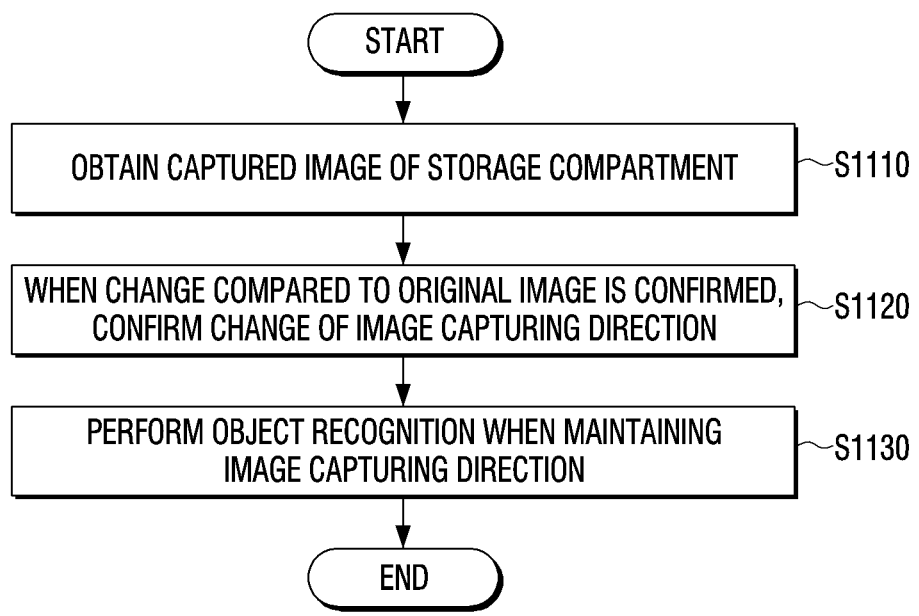
FIG. 11 is a flowchart for illustrating an object recognition method according to an embodiment.

FIG. 11 is a flowchart for illustrating an object recognition method according to an embodiment.

Referring to FIG. 11, the object recognition method according to an embodiment of the disclosure may be performed through the processor 140 of the refrigerator 100 or the processor 230 of the server 200.

First, an image obtained by capturing the inside of the storage compartment is obtained (S1110). Specifically, the processor of the refrigerator may obtain a captured image using the image capturing device and the processor of the server may receive a captured image from the refrigerator via the communication device to obtain the captured image.

When a change of the captured image compared to an original image is identified, the change of the image capturing direction may be identified (S1120). The original image herein may refer to the captured image obtained by capturing the image of the storage compartment by the refrigerator using the image capturing device previously or the captured image obtained by the server by receiving it from the refrigerator previously. In addition, the original image may be an image obtained most recently from among a plurality of captured images obtained previously.

Specifically, a pixel value change region may be detected by comparing each pixel value of the original image with each pixel value of the captured image corresponding thereto so as to identify whether the captured image is changed.

Whether the image capturing direction is changed may be identified by using a plurality of feature points in the original image and a plurality of feature points of the captured image corresponding thereto.

Specifically, the plurality of feature points may be identified from the original image and the plurality of feature points corresponding thereto may be identified from the captured image. If some of the plurality of feature points are not observed from the captured image due to the movement of the object identified in the original image, it may be determined that the image capturing direction is maintained.

More specifically, if a change ratio between the number of the plurality of feature points of the original image and the number of the plurality of feature points of the captured image exceeds a predetermined threshold ratio, it may be determined that the image capturing direction is maintained.

In addition, the change of the image capturing direction may be identified by comparing the movement distance and movement direction of each of the plurality of feature points. Specifically, the plurality of feature points in the original image and the plurality of feature points in the captured image corresponding thereto may be detected and pixel coordinate values between each of the plurality of feature points may be compared to calculate a coordinate change amount of each of the plurality of feature points of the captured image.

In addition, the movement distance and the movement direction of each of the plurality of feature points of the captured image may be calculated by using the calculated coordinate change amount and it may be identified whether the image capturing direction is changed based on the calculated movement distance and movement direction.

More specifically, when the calculated movement distances and movement directions of the plurality of feature points of the captured image coincide within a predetermined error range, it may be determined that the image capturing direction is changed. On the other hand, when a movement distance or a movement direction of at least one feature point of the plurality of feature points of the captured image have a difference beyond the predetermined error range, it may be determined that the image capturing direction is maintained.

In addition, the change of the image capturing direction may be identified by using the artificial intelligence model. Specifically, it may be identified whether the image capturing direction is changed by inputting the original image and the captured image to the artificial intelligence model.

The artificial intelligence model herein may refer to a model trained to identify whether the image capturing direction is changed using a group of images of the same object which are captured by slightly moving upwards, downwards, to the left or right, or a group of images of the same image which are slightly cut in upward, downward, left or right direction as the learning data.

In addition, a type of the artificial intelligence model may correspond to a convolutional neural network (CNN), a recurrent neural network (RNN), a convolutional recurrent neural network (CRNN), and the like and is not limited to the above examples.

In addition, when the image capturing direction is maintained, the object recognition may be performed with respect to the captured image (S1130). On the other hand, when the image capturing direction is changed, the object recognition with respect to the captured image may not be performed and the captured image may be stored by replacing with the original image. In addition, the result of the object recognition performed with respect to the original image may be used again.

Therefore, the object recognition method of the disclosure may identify whether the image capturing direction is changed by comparing the captured image with the original image, and determine not to perform the additional object recognition, when it is identified that the change of the image capturing direction has simply occurred, thereby exhibiting the effect of reducing operation. The object recognition method as in FIG. 11 may be executed on the refrigerator having the configuration of FIG. 1 or FIG. 2 and on the server having the configuration of FIG. 3 or FIG. 4 and may be executed on a refrigerator or a server having other configuration.

In addition, the object recognition method described above may be implemented as at least one execution program for executing the object recognition method described above and such an execution program may be stored in a non-transitory computer-readable medium.

The non-transitory computer-readable medium is not a medium storing data for a short period of time such as a register, a cache, or a memory, but may refer to a medium that semi-permanently stores data and is readable by a machine. Specifically, the various applications or programs described above may be stored and provided to the non-transitory computer-readable medium such as a CD, a DVD, a hard disk drive, a Blu-ray disc, a USB, a memory card, and a ROM.

Figure 12:
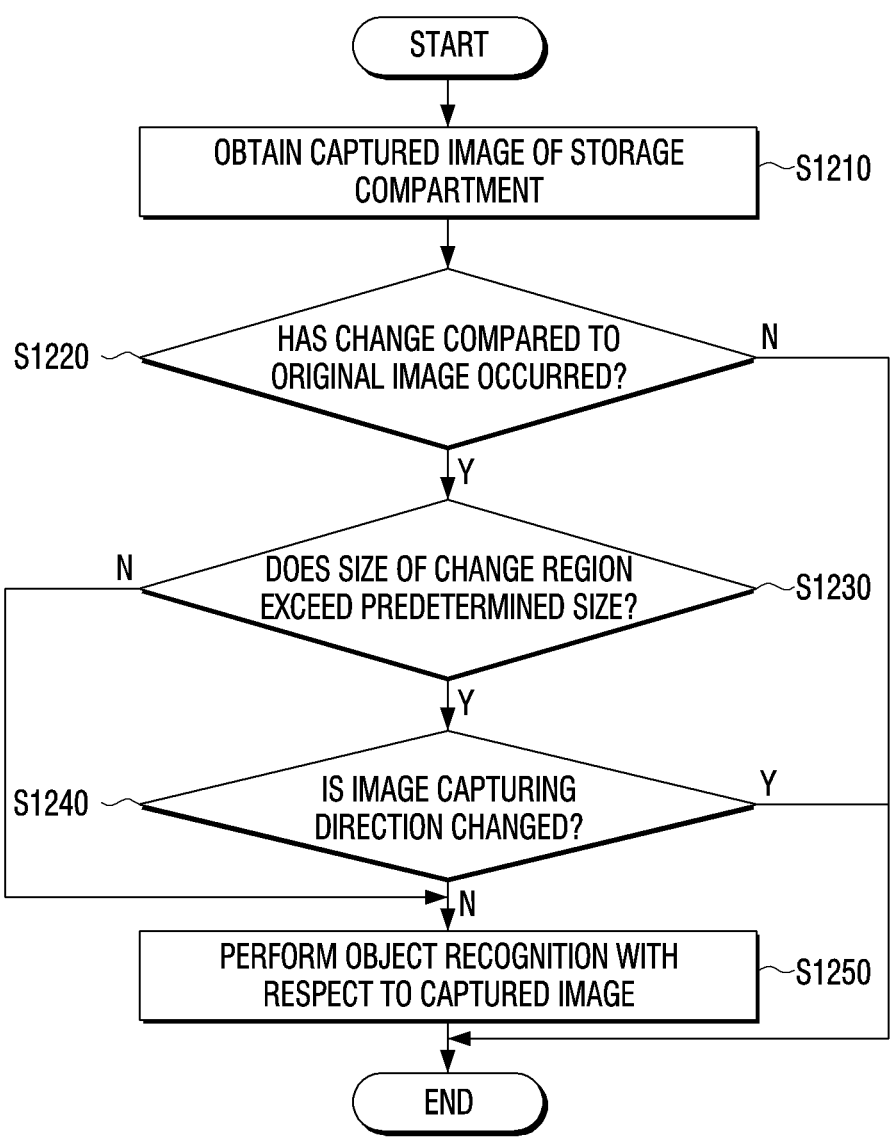
FIG. 12 is a flowchart for specifically illustrating an object recognition method according to an embodiment.

FIG. 12 is a flowchart for specifically illustrating an object recognition method according to an embodiment.

Referring to FIG. 12, a captured image of a storage compartment of a refrigerator may be obtained first (S1210). Specifically, the refrigerator may obtain the image obtained by capturing the storage compartment through the image capturing device and the server may receive the captured image of the storage compartment from the refrigerator via the communication device.

In addition, the change of the captured image compared to the original image may be identified (S1220). Specifically, a pixel value change region may be detected by comparing each pixel value of the original image with each pixel value of the captured image corresponding thereto so as to identify whether the captured image is changed.

When a change occurrence region of the captured image is not detected (S1220—N), it may be determined not to perform the object recognition regarding the captured image. On the other hand, when the change occurrence region of the captured image is detected (S1220—Y), it may be identified that the size of the change occurrence region exceeds a predetermined size (S1230).

When the size of the change occurrence region does not exceed the predetermined size (S1230—N), the object recognition may be performed with respect to the captured image (S1250).

On the other hand, when the size of the change occurrence region exceeds the predetermined size (S1230—Y), the change of the image capturing direction of the captured image may be identified (S1240). The operation of identifying whether the image capturing direction is changed has been specifically described in the part described above in relation to the operation of the processor of the refrigerator or the server and therefore the overlapped description will not be repeated.

When the change of the image capturing direction has occurred (S1240—Y), it may be determined not to perform the object recognition with respect to the captured image. When the change of the image capturing direction has not occurred (S1240—N), the object recognition may be performed with respect to the captured image (S1250).

Accordingly, in the object recognition method of the disclosure, it may be determined whether to perform the operation of identifying the change of the image capturing direction according to the size of the change region of the captured image. Therefore, the effect of preventing the operation of identifying the change of the image capturing direction, although the image capturing direction is maintained obviously, is exhibited. The object recognition method as in FIG. 12 may be executed on the refrigerator having the configuration of FIG. 1 or FIG. 2 and on the server having the configuration of FIG. 3 or FIG. 4 and may be executed on a refrigerator or a server having other configuration.

In addition, the object recognition method described above may be implemented as at least one execution program for executing the object recognition method described above and such an execution program may be stored in a non-transitory computer-readable medium.

Figure 13:
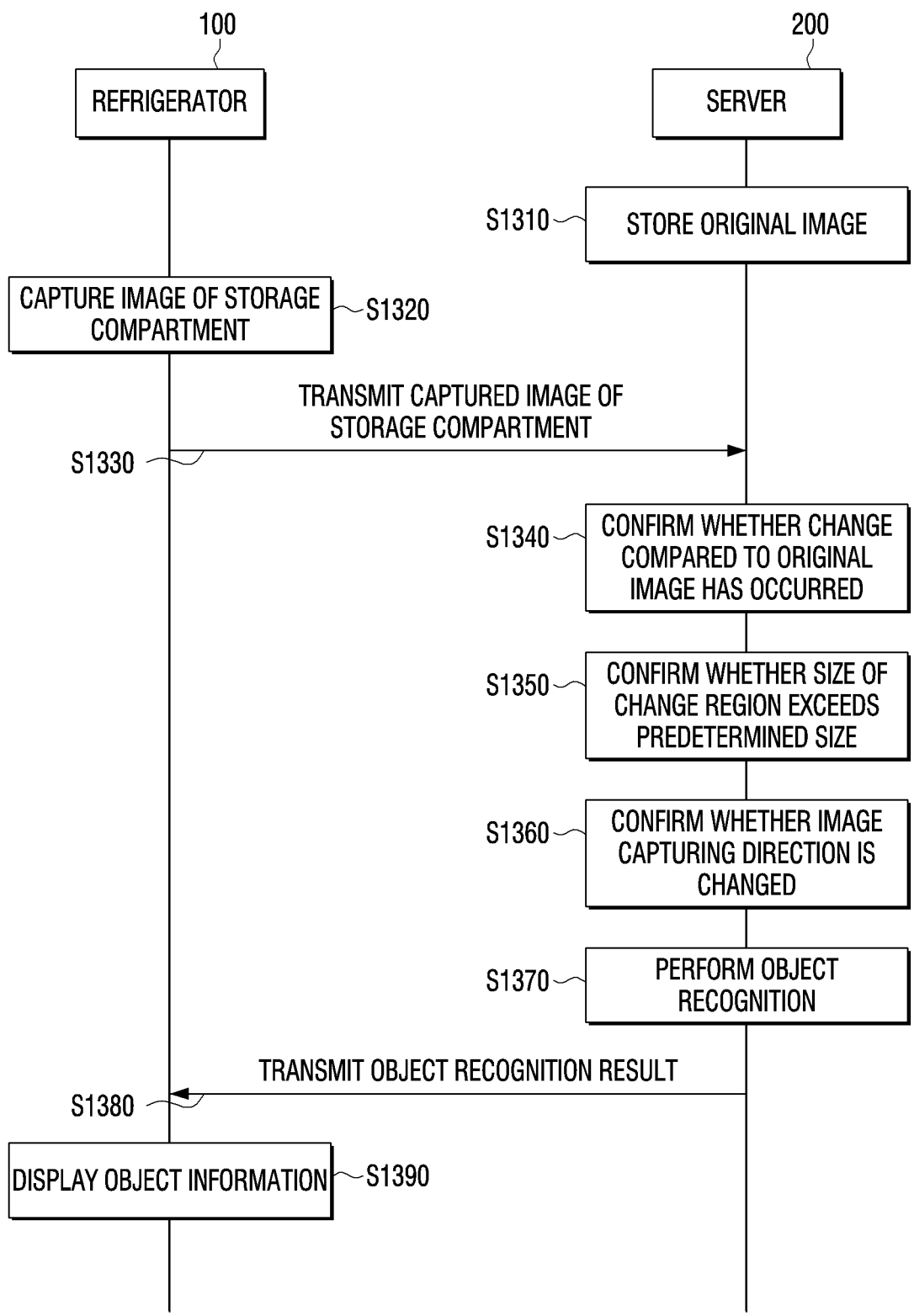
FIG. 13 is a sequence diagram for illustrating an object recognition method using a refrigerator and a server according to a first embodiment.

FIG. 13 is a sequence diagram for illustrating an object recognition method using a refrigerator and a server according to a first embodiment.

First, the server 200 may store the original image obtained by capturing the storage compartment of the refrigerator 100 (S1310). Specifically, the server 200 may receive and store the captured image of the inside of the storage compartment previously captured from the refrigerator 100 via the communication with the refrigerator 100.

In addition, the refrigerator 100 may capture the storage compartment using the image capturing device and obtain the captured image (S1320). The refrigerator 100 may transmit the captured image of the storage compartment to the server 200 (S1330).

In addition, the server 200 may identify whether the change has occurred in the received captured image compared to the original image (S1340).

When the change occurrence region is not detected, the server 200 may not perform the additional object recognition and transmit a result of the object recognition performed with respect to the original image to the refrigerator 100.

On the other hand, when the change occurrence region is detected, the server 200 may identify whether the size of the change occurrence region exceeds the predetermined size (S1350). When the size of the change occurrence region does not exceed the predetermined size, the object recognition may be performed with respect to the captured image. On the other hand, when the size of the change occurrence region exceeds the predetermined size, the change of the image capturing direction may be identified (S1360).

When the image capturing direction is maintained, the object recognition may be performed with respect to the captured image (S1370). On the other hand, when the image capturing direction is not maintained, the result of the object recognition performed with respect to the original image may be transmitted to the refrigerator 100.

In addition, when the object recognition is performed with respect to the captured image, the server 200 may transmit the object recognition result of the captured image to the refrigerator 100, and when the object recognition is not performed with respect to the captured image, the server may transmit the object recognition result of the original image to the refrigerator 100 (S1380).

The refrigerator 100 may display object information to a user by using the received object recognition result (S1390). Specifically, the refrigerator 100 may display the object information to the user via a display.

Accordingly, in the object recognition method of the disclosure, the object recognition information may be obtained without performing the object recognition directly by the refrigerator, thereby exhibiting the effect of providing the information to the user. The object recognition method as in FIG. 13 may be executed on the refrigerator having the configuration of FIG. 1 or FIG. 2 and on the server having the configuration of FIG. 3 or FIG. 4 and may be executed on a refrigerator or a server having other configuration.

In addition, the object recognition method described above may be implemented as at least one execution program for executing the object recognition method described above and such an execution program may be stored in a non-transitory computer-readable medium.

Figure 14:
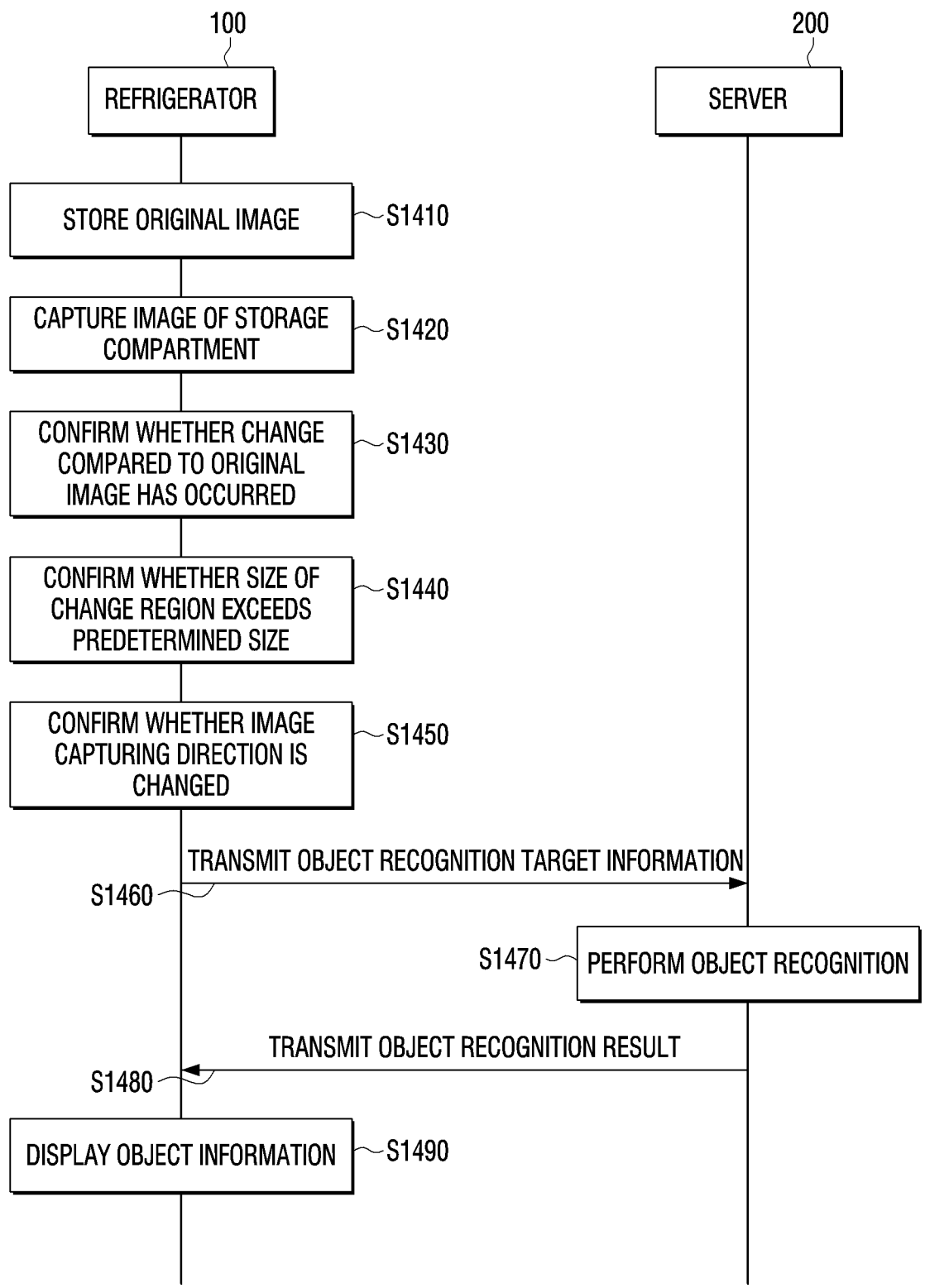
FIG. 14 is a sequence diagram for illustrating an object recognition method using a refrigerator and a server according to a second embodiment.

FIG. 14 is a sequence diagram for illustrating an object recognition method using a refrigerator and a server according to a second embodiment.

First, the refrigerator 100 may store the original image obtained by capturing the storage compartment (S1410). The refrigerator 100 may capture the storage compartment using the image capturing device and obtain the captured image (S1420).

In addition, the refrigerator 100 may identify whether the change has occurred in the captured image compared to the original image (S1430).

When the change occurrence region is not detected, the refrigerator 100 may transmit the original image to the server 200 as object recognition target information without identifying whether the image capturing direction of the captured image is changed.

On the other hand, when the change occurrence region is detected, the refrigerator 100 may identify whether the size of the change occurrence region exceeds the predetermined size (S1440). When the size of the change occurrence region does not exceed the predetermined size, the captured image may be transmitted to the server 200 as the object recognition target information. On the other hand, when the size of the change occurrence region exceeds the predetermined size, the change of the image capturing direction may be identified (S1450).

When the image capturing direction is maintained, the captured image may be transmitted to the server 200 as the object recognition target information. On the other hand, when the image capturing direction is not maintained, the original image may be transmitted to the server 200 as the object recognition target information (S1460).

In addition, the server 200 may perform the object recognition according to the received object recognition target (S1470). For example, when the received object recognition target is the captured image, the object recognition may be performed with respect to the captured image, and when the received object recognition target is the original image, the result of the object recognition performed regarding the original image previously may be identified without performing the additional object recognition.

In addition, the server 200 may transmit the object recognition result corresponding to the object recognition target to the refrigerator 100 (S1480).

The refrigerator 100 may display the object information to the user by using the received object recognition result (S1490). Specifically, the refrigerator 100 may display the object information to the user via the display.

Therefore, in the object recognition method of the disclosure, the refrigerator may determine the object recognition target by identifying whether the image capturing direction is changed, and transmit the determined object recognition target to the server, thereby exhibiting the effect of reducing operation of the server, since it is not necessary for the server to identify the change of the image capturing direction. The object recognition method as in FIG. 14 may be executed on the refrigerator having the configuration of FIG. 1 or FIG. 2 and on the server having the configuration of FIG. 3 or FIG. 4 and may be executed on a refrigerator or a server having other configuration.

In addition, the object recognition method described above may be implemented as at least one execution program for executing the object recognition method described above and such an execution program may be stored in a non-transitory computer-readable medium.

While preferred embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

INDUSTRIAL APPLICABILITY

[Sequence List Free Text]

What is claimed is:
1. An object recognition method of a refrigerator with an image capturing device, a memory to store images and a processor, the method comprising:
obtaining by the image capturing device, a captured image of a storage compartment of the refrigerator;
based on a change of the captured image compared to an original image that is stored being identified by the processor, identifying whether a change has occurred in an image capturing direction of the image capturing device through which the captured image of the storage compartment is captured;
determining whether to perform an object recognition operation based on the identifying of whether the change has occurred in the image capturing direction of the image capturing device; and
based on no change in the image capturing direction being determined, performing, by the processor, the object recognition operation according to the captured image to thereby obtain information associated with an item in the storage compartment of the refrigerator.

2. The object recognition method according to claim 1, further comprising:
based on the change in the image capturing direction being identified, storing the captured image by replacing with the original image.

3. The object recognition method according to claim 1, wherein the identifying whether the change has occurred in the image capturing direction comprises
identifying the change in the image capturing direction by using an artificial intelligence model set to identify the change in the image capturing direction, and
wherein the artificial intelligence model is at least one of a convolutional neural network (CNN), a recurrent neural network (RNN), and a convolutional recurrent neural network (CRNN).

4. The object recognition method according to claim 1, wherein the identifying whether the change has occurred in the image capturing direction comprises:
detecting a pixel value change region by comparing each of pixels between the original image and the captured image; and
based on an area of the pixel value change region being larger than a predetermined size, identifying the change has occurred in the image capturing direction.

5. The object recognition method according to claim 4, wherein the identifying whether the change has occurred in the image capturing direction comprises:
detecting a plurality of second feature points corresponding to a plurality of first feature points in the original image from the captured image; and
calculating movement distances and movement directions of the plurality of second feature points by comparing a pixel coordinate value of each of the plurality of first feature points and the plurality of second feature points, and identifying the change in the image capturing direction based on the calculated movement distances and movement directions.

6. The object recognition method according to claim 5, wherein the identifying the change in the image capturing direction based on the movement distances and the movement directions comprises:
based on the movement distances and the movement directions of the plurality of second feature points coinciding within a predetermined error range, determining that the image capturing direction is changed; and
based on a movement distance or a movement direction of at least one second feature point from among the plurality of second feature points being different from movement distances or movement directions of the remaining second feature points beyond the predetermined error range, determining that the image capturing direction is maintained.

7. The object recognition method according to claim 5, wherein the identifying whether the change has occurred in the image capturing direction comprises:
based on a change ratio between a number of the plurality of second feature points and a number of the plurality of first feature points exceeding a predetermined threshold ratio, determining that the image capturing direction is maintained.

8. A refrigerator comprising:
a storage compartment configured to store an item;
an image capturing device configured to capture an image of the storage compartment;
a memory configured to store an original image previously captured by the image capturing device; and
a processor configured to,
obtain a captured image by controlling the image capturing device to capture an image of the storage compartment,
based on a change of the captured image compared to the original image being identified, identify whether an image capturing direction of the image capturing device is changed,
determine whether to perform an object recognition operation based on the identifying of whether the change has occurred in the image capturing direction of the image capturing device, and
based on no change in the image capturing direction being determined, perform the object recognition operation according to the captured image to thereby obtain information associated with the item in the storage compartment of the refrigerator.

9. The refrigerator according to claim 8, wherein the processor is configured to, based on the change in the image capturing direction being identified, store the captured image in the memory by replacing with the original image.

10. The refrigerator according to claim 8, wherein the processor is configured to identify the change in the image capturing direction by using an artificial intelligence model set to identify the change in the image capturing direction, and
wherein the artificial intelligence model is at least one of a convolutional neural network (CNN), a recurrent neural network (RNN), and a convolutional recurrent neural network (CRNN).

11. The refrigerator according to claim 8, wherein the processor is configured to:
detect a pixel value change region by comparing pixels of the each of the original image and the captured image; and
based on an area of the pixel value change region being larger than a predetermined size, identify the change in the image capturing direction.

12. The refrigerator according to claim 11, wherein the processor is configured to:
detect a plurality of second feature points corresponding to a plurality of first feature points in the original image from the captured image, calculate movement distances and movement directions of the plurality of second feature points by comparing a pixel coordinate value of each of the plurality of first feature points and the plurality of second feature points, and identify the change in the image capturing direction based on the calculated movement distances and movement directions.

13. The refrigerator according to claim 12, wherein the processor is configured to:
based on the movement distances and the movement directions of the plurality of second feature points coinciding within a predetermined error range, determine that the image capturing direction is changed; and
based on a movement distance or a movement direction of at least one second feature point from among the plurality of second feature points being different from movement distances or movement directions of the remaining second feature points beyond the predetermined error range, determine that the image capturing direction is maintained.

14. The refrigerator according to claim 12, wherein the processor is configured to:
based on a change ratio between a number of the plurality of second feature points and a number of the plurality of first feature points exceeding a predetermined threshold ratio, determine that the image capturing direction is maintained.

15. A server comprising:
a memory configured to store an original image obtained by capturing an image of a storage compartment of a refrigerator;
a communication device configured to receive a captured image obtained by capturing the storage compartment of the refrigerator from the refrigerator; and
wherein, based on whether a change has occurred in the captured image compared to the original image being confirmed, identify whether an image capturing direction of the captured image is changed,
based on the identifying of whether the change has occurred in the image capturing direction of an image capturing device, determine whether to perform an object recognition operation; and
based on no change of the image capturing direction being determined, perform, by a processor, the object recognition operation according to the captured image to thereby obtain information associated with an item in the storage compartment of the refrigerator.

* * * * *

UNITED STATES PATENT AND TRADEMARK OFFICE
CERTIFICATE OF CORRECTION

| | | |
|---|---|---|
| PATENT NO. | : 11,594,019 B2 | Page 1 of 1 |
| APPLICATION NO. | : 17/268009 | |
| DATED | : February 28, 2023 | |
| INVENTOR(S) | : Seongjoo Han | |

It is certified that error appears in the above-identified patent and that said Letters Patent is hereby corrected as shown below:

In the Claims

Column 24, Lines 38-39:
In Claim 15, after "a captured image" delete "obtained by capturing" and insert --of--.

Signed and Sealed this
Eighteenth Day of April, 2023

*Katherine Kelly Vidal*

Katherine Kelly Vidal
*Director of the United States Patent and Trademark Office*